(12) United States Patent
Stiesdal (10) Patent No.: US 8,004,107 B2
(45) Date of Patent: Aug. 23, 2011

(54) DIRECT DRIVE GENERATOR AND WIND TURBINE

(75) Inventor: Henrik Stiesdal, Odense C (DK)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 12/992,088

(22) PCT Filed: Jun. 25, 2009

(86) PCT No.: PCT/EP2009/057977
§ 371 (c)(1),
(2), (4) Date: Nov. 11, 2010

(87) PCT Pub. No.: WO2010/003830
PCT Pub. Date: Jan. 14, 2010

(65) Prior Publication Data
US 2011/0062719 A1    Mar. 17, 2011

(30) Foreign Application Priority Data
Jul. 7, 2008  (EP) ..................... 08012250

(51) Int. Cl.
*F03D 11/00* (2006.01)
(52) U.S. Cl. ..................... 290/55; 310/254.1
(58) Field of Classification Search ............. 290/55
See application file for complete search history.

(56) References Cited

U.S. PATENT DOCUMENTS

| 4,291,235 | A * | 9/1981 | Bergey et al. | 290/55 |
|---|---|---|---|---|
| 6,285,090 | B1 * | 9/2001 | Brutsaert et al. | 290/55 |
| 6,483,199 | B2 | 11/2002 | Umemoto et al. | |
| 6,504,260 | B1 * | 1/2003 | Debleser | 290/44 |
| 6,781,276 | B1 | 8/2004 | Stiesdal et al. | |
| 6,911,741 | B2 * | 6/2005 | Pettersen et al. | 290/44 |
| 7,075,192 | B2 * | 7/2006 | Bywaters et al. | 290/55 |
| 7,119,453 | B2 | 10/2006 | Bywaters et al. | |
| 7,431,567 | B1 * | 10/2008 | Bevington et al. | 416/244 R |
| 7,547,985 | B2 * | 6/2009 | Takaichi et al. | 290/55 |
| 7,550,863 | B2 * | 6/2009 | Versteegh | 290/44 |
| 7,642,668 | B2 * | 1/2010 | Kim et al. | 290/55 |
| 7,736,125 | B2 * | 6/2010 | Bagepalli et al. | 415/126 |
| 2001/0035651 | A1 * | 11/2001 | Umemoto et al. | 290/44 |
| 2006/0071575 | A1 * | 4/2006 | Jansen et al. | 310/266 |
| 2006/0152014 | A1 | 7/2006 | Grant et al. | |

FOREIGN PATENT DOCUMENTS

| DE | 20116649 U1 | 1/2002 |
|---|---|---|
| EP | 0864748 A1 | 9/1998 |
| EP | 1641102 A1 | 3/2006 |
| EP | 2014917 A1 | 1/2009 |
| WO | WO 0205408 A1 | 1/2002 |
| WO | WO 02057624 A1 | 7/2002 |
| WO | WO 03023943 A2 | 3/2003 |

* cited by examiner

*Primary Examiner* — Joseph Waks

(57) ABSTRACT

A direct drive generator for a wind turbine is provided. The direct drive generator includes a stator arrangement and a rotor arrangement. The stator arrangement and/or the rotor arrangement include an at least partly flexible front and/or rear endplate. The endplate is at least partly made of fiberglass.

17 Claims, 4 Drawing Sheets

DIRECT DRIVE GENERATOR AND WIND TURBINE

CROSS REFERENCE TO RELATED APPLICATIONS

This application is the US National Stage of International Application No. PCT/EP2009/057977 filed Jun. 25, 2009, and claims the benefit thereof. The International Application claims the benefits of European Patent Application No. 08012250.0 EP filed Jul. 7, 2008. All of the applications are incorporated by reference herein in their entirety.

FIELD OF INVENTION

The invention relates to a direct drive generator for a wind turbine and a wind turbine comprising such a direct drive generator.

BACKGROUND OF INVENTION

In principle there are two main types of wind turbines in view of the drive configuration of a wind turbine. The first type of a wind turbine is the more classical type of a wind turbine comprising a gearbox arranged between the main shaft and a generator of the wind turbine. The second type of a wind turbine is a gearless type comprising a direct drive or a directly driven generator. Such a direct drive generator can be made as a synchronous generator with winded rotor or with permanent magnets attached to the rotor, or it can be designed as an alternative type of a generator. Independently from the type of a direct drive generator it is desirable that the width of the air gap between the rotor and the stator of the generator is preferably maintained constantly or at least within certain tolerances during the operation of the wind turbine and the direct drive generator respectively even when the arrangement of wind turbine rotor, main shaft and direct drive generator is subject to loads.

Therefore different bearing arrangements for a drive configuration of a wind turbine comprising a direct drive generator were developed. Up to now the classical bearing arrangement of a direct drive generator is a two-bearing arrangement. Thereby the rotor of the generator which is connected to the wind turbine rotor is supported with two bearings towards a stationary inner shaft or a fixed inner shaft. The stator is on one side attached to the stationary inner shaft. Thus the rotor can turn relatively to the stator around the stationary inner shaft. Wind turbines with such a design are e.g. described in EP 1 641 102 A1 and U.S. Pat. No. 6,483,199 B2. The drawback of such a design is that the one-side support of the stator makes it difficult to maintain the width of the air gap at least substantially constant at the unsupported side of the stator in particular when the entire generator structure is not only subject to gravity and mass inertia but also to unbalanced magnetic pull. In order to reduce this drawback a direct drive generator with such a two-bearing arrangement needs a large and heavy stator support structure capable of absorbing relatively large bending moments of the stator. Such a stator support structure is e.g. described in WO 02/05408 A1 wherein the stator support structure comprises a support construction having a plenty of support arms.

In an alternative design the two-bearing arrangement is replaced with a single bearing with a stationary inner bearing part attached to a stationary inner shaft and a rotating outer bearing part supporting the rotor of the direct drive generator. Wind turbines comprising a direct drive generator with a single bearing are disclosed in US 2006/0152014 A1 and WO 02/057624 A1. But the replacement of the two bearings with a single bearing does not substantially change the drawback of the unilaterally supported stator structure.

In some further solutions the stationary inner shaft concept is replaced with a rotating shaft concept. Since the stator of the generator is supported on both sides according to the rotating shaft concept, it is easier to maintain the width of the air gap between the rotor and the stator of the generator at least substantially constantly. There are two known variants of the rotating shaft concept, one with a two-bearing arrangement and one with a four-bearing arrangement.

According to the two-bearing arrangement the bearings of the generator act as bearings of a main shaft for the wind turbine which main shaft is connected to the wind turbine rotor. The stator structure is supported towards the main shaft and attached to a bedplate of the wind turbine. Wind turbines having such a design are disclosed in U.S. Pat. No. 7,119,453 B2 and WO 03/023943 A2. A drawback of this design is that the stator structure needs to be dimensioned to absorb and transfer all wind turbine rotor loads, i.e. the weight of the wind turbine rotor and all asymmetric aerodynamic loads to maintain the width of the air gap within the necessary tolerances. On large wind turbines this leads to very heavy and expensive stator structures.

In the four-bearing arrangement the main shaft of the wind turbine which is connected to the wind turbine rotor on its one end is supported by its own two bearings and carries at its other end the direct drive generator. The direct drive generator has a two-bearing arrangement for the centering of the rotor inside the stator. An example of such a wind turbine is described in U.S. Pat. No. 6,781,276 B1. In this main shaft mounted arrangement the generator stator is carried by the generator rotor and torque is transferred from the generator to the wind turbine bedplate through a torque aim arrangement. The torque arm arrangement needs to comprise some kind of flexibility, e.g. implemented with rubber elements, to allow for minor misalignments between the main shaft—generator structure and the turbine bedplate. The bilateral support of the stator on the rotor enables for a relatively lightweight stator structure. The main drawback of this design is that a total of four bearings are required, and that the full torque has at least partially to pass through these bearings. For large wind turbines this means comparatively large and expensive bearings. Furthermore, for large wind turbines the torque arm arrangement becomes a comparatively substantial and heavy structure.

In U.S. Pat. No. 4,291,235 a further bearing arrangement for a wind turbine is described. The wind turbine comprises a stationary shaft as well as a direct drive generator having an inner stator and an outer rotor. The inner stator is arranged on the stationary shaft. The outer rotor is connected to the hub of the wind turbine, on the front side connected to the stationary shaft by a front bearing and on the rear side connected to the stationary shaft by rear bearing. Thereby the bearing arrangement is not optimal in relation to the load capacity.

Furthermore, in EP 2 014 917 A1 a wind turbine comprising a direct drive generator having a rotor and a stator is described. The rotor of the direct drive generator is attached to the rear side of a main shaft which main shaft is supported by two main bearings. The stator is substantially arranged around the rotor and comprises a front endplate, a rear endplate and a casing element connecting the front and the rear endplate to each other. The rear endplate of the stator is supported on the rotor or the main shaft by a third bearing. The front endplate of the stator is at least indirectly attached to a stationary part of the wind turbine. Therefore, in the EP 2 014 917 A1, a three bearing arrangement is described.

Such a three bearing structure can be sometimes statically undetermined. In this case any misalignments due to mounting tolerances or any deformations arising as a result of gravity or external loads to the main shaft and/or the direct drive generator could potentially lead to an uneven load distribution between the three bearings of the wind turbine which in turn could cause a premature bearing failure. The front endplate of the stator is therefore at least partially in a certain adequate extent flexible in the directions of a centre axis of the main shaft.

Thus the potential problem of a static indeterminacy of the three bearing arrangement is eliminated by establishing a sufficient flexibility of the front endplate in the directions of the centre axis of the main shaft. The front endplate acts like a membrane supporting the stator substantially firmly in the radial direction so as to maintain the air gap, but flexing readily so as to enable e.g. a bending of the main shaft with no major resistance.

SUMMARY OF INVENTION

It is an object of the present invention to indicate an appropriate material for a flexible endplate of a direct drive generator of a wind turbine to preferably guarantee a sufficient flexibility of the endplate.

This object is inventively achieved by a direct drive generator for a wind turbine comprising a stator arrangement and a rotor arrangement, wherein the stator arrangement and/or the rotor arrangement comprises at least one at least partly flexible front and/or rear endplate, wherein the at least one endplate is at least partly, preferably completely made of fibreglass. Fibreglass comprises a relatively low module of elasticity and is therefore an appropriate material for the at least one endplate in view of the required flexibility. Additionally fibreglass comprises excellent corrosion behaviour, even in an aggressive environment like an offshore application of a wind turbine. A further advantage of fibreglass as material for a generator is the well electrical isolation. A direct drive generator comprising at least one such an endplate made of fibreglass is therefore well suitably for a wind turbine comprising a drive configuration which could be sometimes statically undetermined, e.g. a drive configuration with a three bearing structure.

According to an embodiment of the invention the direct drive generator comprises a centre axis, wherein the at least one endplate is at least partially in a certain extent flexible in the directions of the centre axis. Thus the potential problem of a static indeterminacy e.g. of a three bearing arrangement is eliminated by establishing a sufficient flexibility of the at least one endplate in the directions of the centre axis of the direct drive generator. When required the at least one endplate flexing readily so as to enable e.g. a bending of a respective component of the drive configuration of the wind turbine with no major resistance so that there occurs substantially no uneven load distribution between e.g. the three bearings of the drive configuration of the wind turbine.

According to a variant of the invention the at least one endplate is a ring-shaped endplate. According to a further variant of the invention the at least one endplate has a thickness of approximately 15-50 mm, preferably 20-30 mm in the direction of the centre axis. Thus the at least one endplate has such dimensions e.g. in dependence of the structure of the at least one endplate that the at least one endplate has a comparatively little bending stiffness.

In an embodiment of the invention the stator arrangement is substantially arranged around the rotor arrangement, comprises a front endplate, a rear endplate and a hollow cylindrical stator element connecting the front endplate and the rear endplate with each other. Preferably the hollow cylindrical stator element comprises on the inside at least one lamination stack provided with at least one winding, typically with a plurality of windings.

In a further embodiment of the invention the rotor arrangement is substantially arranged inside the stator arrangement. In particular the rotor arrangement comprises a front endplate, a rear endplate and a hollow cylindrical rotor element connecting the front endplate and the rear endplate with each other. Preferably the hollow cylindrical rotor element comprises on the outside at least one permanent magnet arranged oppositely to the lamination stack with windings for power generation. As a rule a plurality of permanent magnets are arranged on the outer surface of the hollow cylindrical rotor element.

In another embodiment of the invention the rotor arrangement is substantially arranged around the stator arrangement, comprises a front endplate, a rear endplate and a hollow cylindrical rotor element connecting the front endplate and the rear endplate with each other. Preferably the hollow cylindrical rotor element comprises at least one permanent magnet on the inside. As a rule a plurality of permanent magnets are arranged on the inner surface of the hollow cylindrical rotor element.

According to a variant of the invention the stator arrangement is substantially arranged inside the rotor arrangement and comprises a stator support structure. Preferably at least one lamination stack provided with at least one winding, typically with a plurality of windings, is arranged on the stator support structure oppositely to the permanent magnets for power generation.

The object of the invention is also achieved by a wind turbine comprising a direct drive generator as previously disclosed and a drive configuration for turning the rotor arrangement relatively to the stator arrangement comprising at least three bearings or two bearings wherein at least one of the two bearings is a four-point bearing which typically shows the behaviour of two bearings so that the two bearing arrangement with at least one four-point bearing behaves like a three bearing structure.

BRIEF DESCRIPTION OF THE DRAWINGS

The invention will in the following be explained in more detail with reference to the schematic drawing, wherein.

DETAILED DESCRIPTION OF INVENTION

Figure 1:
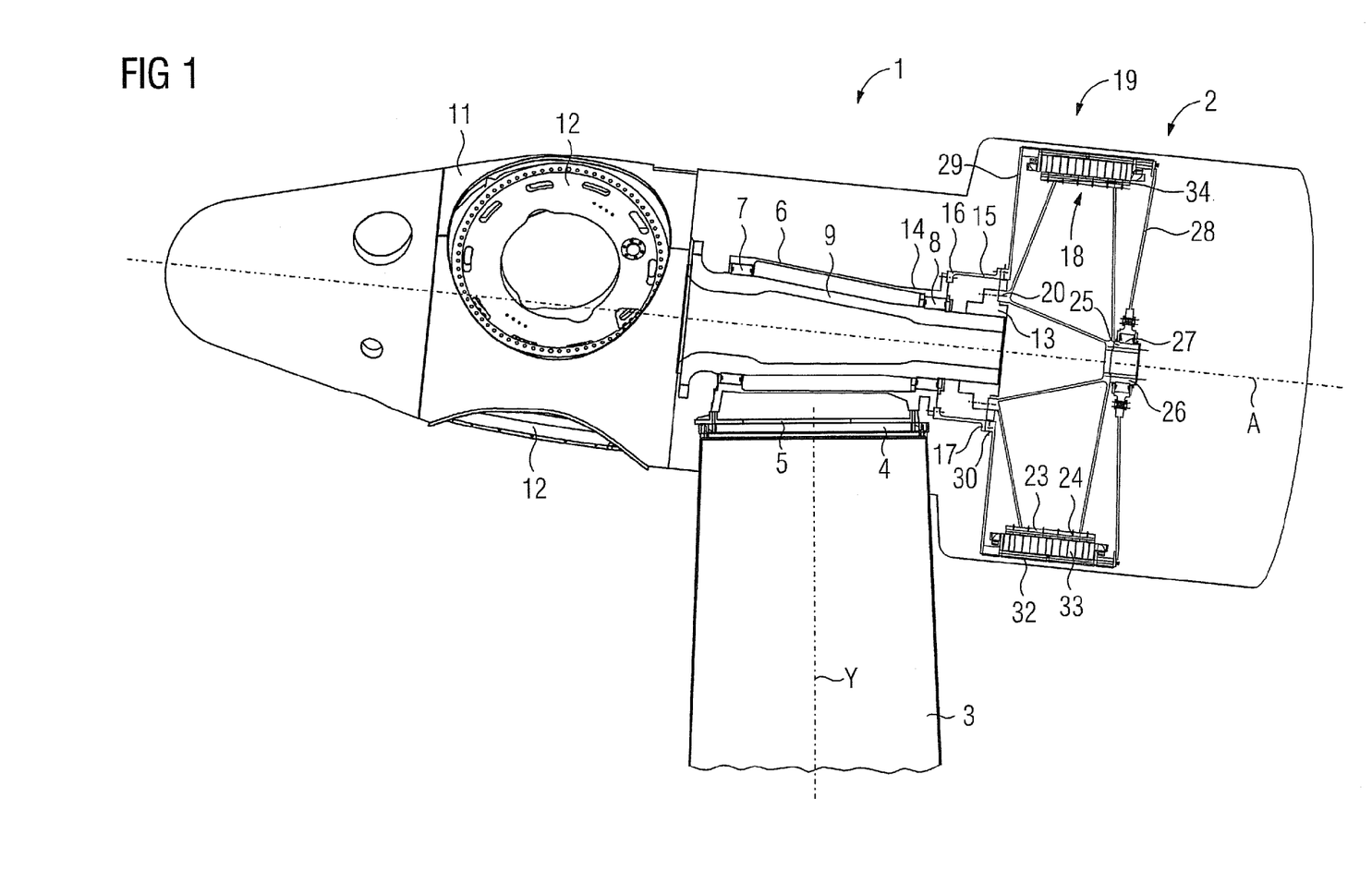
FIG. 1 shows a first type of a wind turbine comprising a direct drive generator having a flexible endplate.

FIG. 1 shows schematically a first embodiment of a wind turbine 1 comprising a direct drive generator 2 which is arranged on the downwind side of a tower 3 of the wind turbine 1.

A tower flange 4 is arranged on the top of the tower 3. A bedplate 5 is attached to the tower flange 4. The wind turbine 1 comprises in a not explicitly shown manner a yaw system for turning the bedplate 5 of the wind turbine around the axis Y together with the other components of the wind turbine 1 which are directly or indirectly attached to the bedplate 5.

A bearing housing 6 is firmly arranged on the bedplate 5. The bearing housing 6 comprises two main bearings 7 and 8. Whilst each fixed part of the main bearings 7, 8 is attached to the bearing housing 6, each rotating part of the main bearings 7, 8 is attached to a main shaft 9. On the front end the main shaft 9 is connected to a hub 11 of the wind turbine 1. The hub 11 comprises three mounting devices 12 for three not shown, but well known wind turbine rotor blades.

On the rear end the main shaft 9 comprises a ring like flange 13 firmly connected to the main shaft 9. Also the bearing housing 6 comprises on the rear end a ring like flange 14. A tube like connection piece 15 with a first flange 16 on its front side and with a second flange 17 on its rear side is bolted with the ring like flange 14 of the bearing housing 6.

The direct drive generator 2 is arranged on the main shaft 9 and on the bearing housing 6 and thus on the bedplate 5. The main shaft 9 and the direct drive generator 2 comprise a joint centre axis A. The direct drive generator 2 is one unit comprising a rotor arrangement 18 and a stator arrangement 19.

The rotor arrangement 18 comprises on the front side a ring like flange 20. The ring like flange 20 is bolted with the ring like flange 13 of the main shaft 9. Not in detail shown permanent magnets 24 are mounted on the outer surface of a ring element 23 of the rotor arrangement 18. On the rear side the rotor arrangement 18 comprises a lug 25. A tube like projection 26 is attached to the lug 25 by bolts. A third bearing 27 is arranged on the tube like projection 26.

The stator arrangement 19 comprises a rear ring-shaped stator endplate 28 attached to the substantially stationary part or housing of the third bearing 27.

Furthermore the stator arrangement 19 comprises a front ring-shaped stator endplate 29 having a ring like flange 30. The ring like flange 30 of the front endplate 29 and the ring like flange 17 of the tube like connection piece 15 are bolted together. A hollow cylindrical stator element 32 connects the front ring-shaped endplate 29 and the rear ring-shaped endplate 29 to each other. The hollow cylindrical stator element 32 comprises on the inside and the inner surface respectively a lamination stack 33 with windings.

The lamination stack 33 with windings of the stator arrangement 19 and the permanent magnets 24 of the rotor arrangement 18 are arranged oppositely to each other with an intermediate ring-shaped air gap 34 of approximately 5 mm. Thus the rotor arrangement 18 can turn together with the main shaft 9 relatively to the stator arrangement 19 around the centre axis A.

According to the described three-bearing arrangement in particular comprising the main shaft 9 and the direct drive generator 2 the stator arrangement 19 is supported on the rear side with the rear endplate 28 on the rotor arrangement 18 via the third bearing 27 and is supported on the front side with the front endplate 29 via the bearing housing 6 on the fixed structure of the wind turbine bedplate 5 close to the main bearing 8.

For avoiding situations in which the three-bearing arrangement is statically undetermined the front endplate 29 of the stator arrangement 19 which is supported on the fixed structure of the bedplate 5 is made of fibreglass and thus comprises sufficient flexibility in the directions of the centre axis A. Thereby the front endplate 29 acts like a membrane supporting the stator arrangement 19 substantially firmly in the radial direction so as to maintain the width of the air gap 34 substantially constant, but flexing readily so as to allow e.g. a bending of the main shaft 9 with no major resistance. The front endplate 29 has thereby a thickness of approximately 15-50 mm, preferably 20-30 mm and has a comparatively little bending stiffness. It simply flexes passively in the directions of the axis A when e.g. the main shaft 9 is shifted a bit by deflection. Thus when a bending of the main shaft 9 to which the rotor arrangement 18 is attached occurs the front endplate 29 bends in the directions of the centre axis A wherein the width of the air gap 34 is maintained substantially constant or within the required tolerances. Moreover an uneven load distribution between the three bearings of the wind turbine is avoided.

Figure 2:
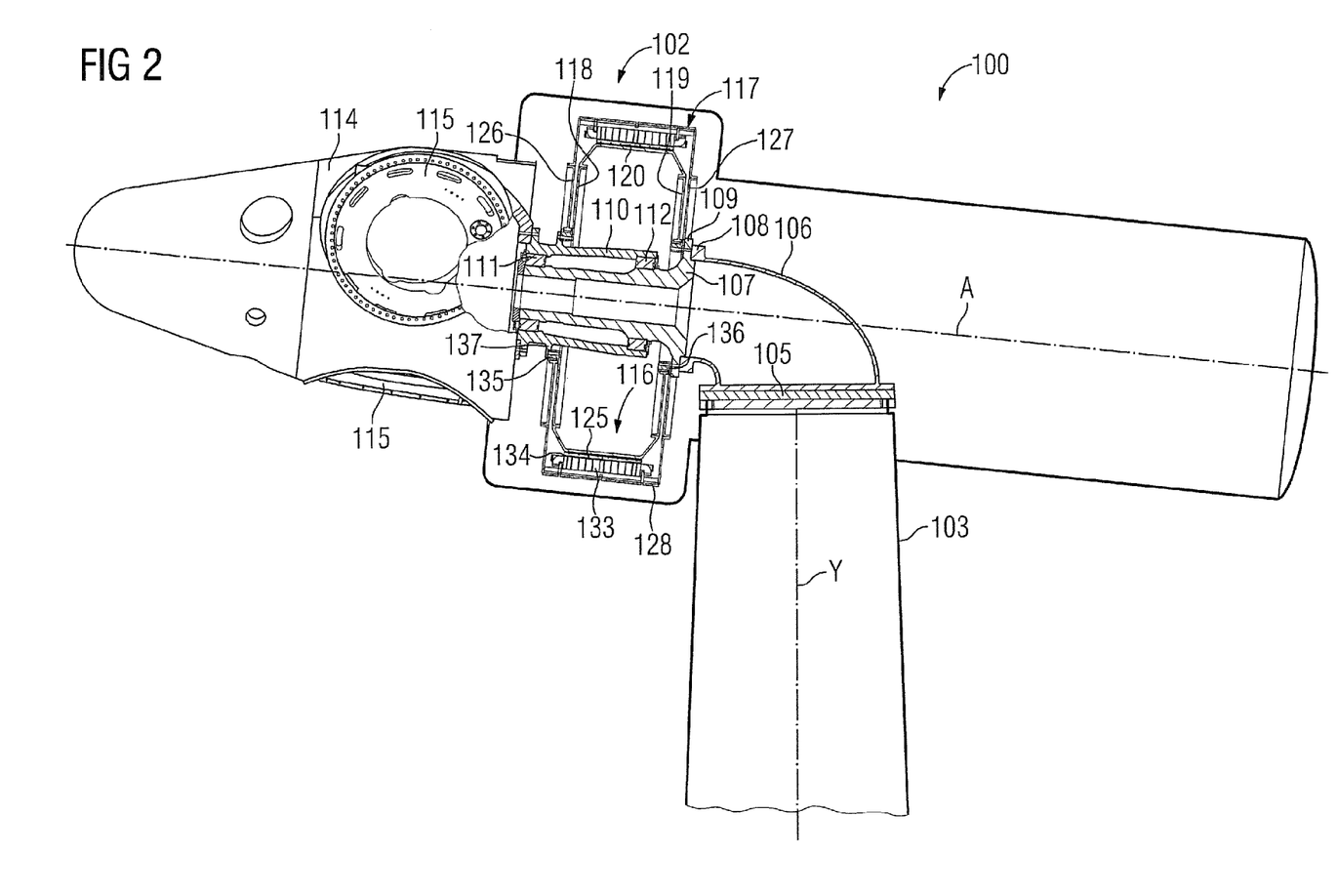
FIG. 2 shows a second type of a wind turbine comprising a direct drive generator having two flexible endplates.

FIG. 2 shows schematically a second embodiment of a wind turbine 100 comprising a direct drive generator 102 which is arranged on the upwind side of a tower 103 of the wind turbine 100.

A retaining arm 106 is on its base side directly arranged on a bedplate 105. On the other side the retaining atm 106 comprises a flange 108. A stationary shaft 107 is attached to the flange 108 with a flange 109.

A main shaft 110 is supported towards the stationary shaft 107 by means of a first main bearing 111 and a second main bearing 112. On the front end the main shaft 110 is connected to a hub 114 of the wind turbine 100. The hub 114 comprises three mounting devices 115 for three not explicitly shown, but well known wind turbine rotor blades.

The direct drive generator 102 is substantially arranged around the main shaft 110 and comprises a rotor arrangement 116 and a stator arrangement 117.

The rotor arrangement 116 comprises a front ring-shaped rotor endplate 118, a rear ring-shaped rotor endplate 119 and a hollow cylindrical rotor element 120 connecting the front 118 and the rear 119 rotor endplate with each other. The hollow cylindrical rotor element 120 carries around its outer perimeter not in detail shown permanent magnets 125.

The stator arrangement 117 comprises a front ring-shaped stator endplate 126, a rear ring-shaped stator endplate 127 and a hollow cylindrical stator element 128 connecting the front 126 and the rear 127 stator endplate with each other. The hollow cylindrical stator element 128 carries around its inner perimeter a not in detail shown lamination stack 133 with windings.

The lamination stack 133 with windings and the permanent magnets 125 are arranged oppositely to each other for power generation with an intermediate ring-shaped air gap 134 of approximately 5 mm. The width of the air gap 134 is so small that the air gap 134 is not explicitly visible in FIG. 2.

In order that the rotor arrangement 116 can turn together with the main shaft 110 around a centre axis A of the direct drive generator 102 and relatively to the stator arrangement 117 the wind turbine 100 in particular the direct drive generator 102 comprise a third or front generator bearing 135 and a fourth or rear generator bearing 136.

The third bearing 135 is in case of the present embodiment of the invention attached to a flange 137 of the main shaft 110. More precisely the inner bearing shell of the third bearing 135 is firmly attached to the flange 137 of the main shaft 110. The inner bearing shell of the third bearing 135 is furthermore firmly attached to the front rotor endplate 118, which supports the front part of the rotor arrangement 116. The outer bearing shell of the third bearing 135 is firmly connected to the front stator endplate 126, which supports the front part of the stator arrangement 117.

The rear part of the stator arrangement 117 is supported by the rear stator endplate 127, which is firmly connected to the flange 109 of the stationary shaft 107 and thus to the retaining arrangement. In case of the present embodiment of the invention the inner bearing shell of the fourth bearing 136 is firmly attached to the rear stator endplate 127 and the rear rotor endplate 119 supporting the rear part of the rotor arrangement 116 is firmly connected to the outer bearing shell of the fourth bearing 136.

Based on the described arrangement comprising the main shaft 110, the first main bearing 111, the second main bearing 112, the rotor arrangement 116, the stator arrangement 117, the third bearing 135 and the fourth bearing 136 the main shaft 110 turns in operation of the wind turbine 100 together with the rotor arrangement 116 relatively to the stator arrangement 117.

For avoiding situations in which this four bearing arrangement is statically undetermined in case of the present embodiment of the invention the front rotor endplate 118 firmly supported on the main shaft 110 and the rear stator endplate 127 firmly supported on the retaining arrangement are made of fibreglass and thus comprise a certain and sufficient extent of flexibility in the directions of the centre axis A. The front rotor endplate 118 and the rear stator endplate 127 have thereby a thickness of approximately 15-50 mm, preferably 20-30 mm and a comparatively little bending stiffness. Thereby these end plates 118, 127 act like membranes supporting the rotor arrangement 116 and the stator arrangement 117 substantially firmly in the radial direction so as to maintain the width of the air gap 134, but flexing readily so as to allow e.g. a bending of the main shaft 110 with no major resistance. The end plates 118, 127 simply flex passively when e.g. the main shaft 110 is shifted a bit by deflection. Thus when a bending of the main shaft 110 occurs to which the rotor arrangement 116 and the stator arrangement 117 are connected the front rotor endplate 118 and the rear stator endplate 127 bend in substantially a respective way in the directions of the centre axis A wherein the width of the air gap 134 is maintained substantially constant or within required tolerances. Further more an uneven load distribution between the four bearings of the wind turbine is avoided.

Figure 3:
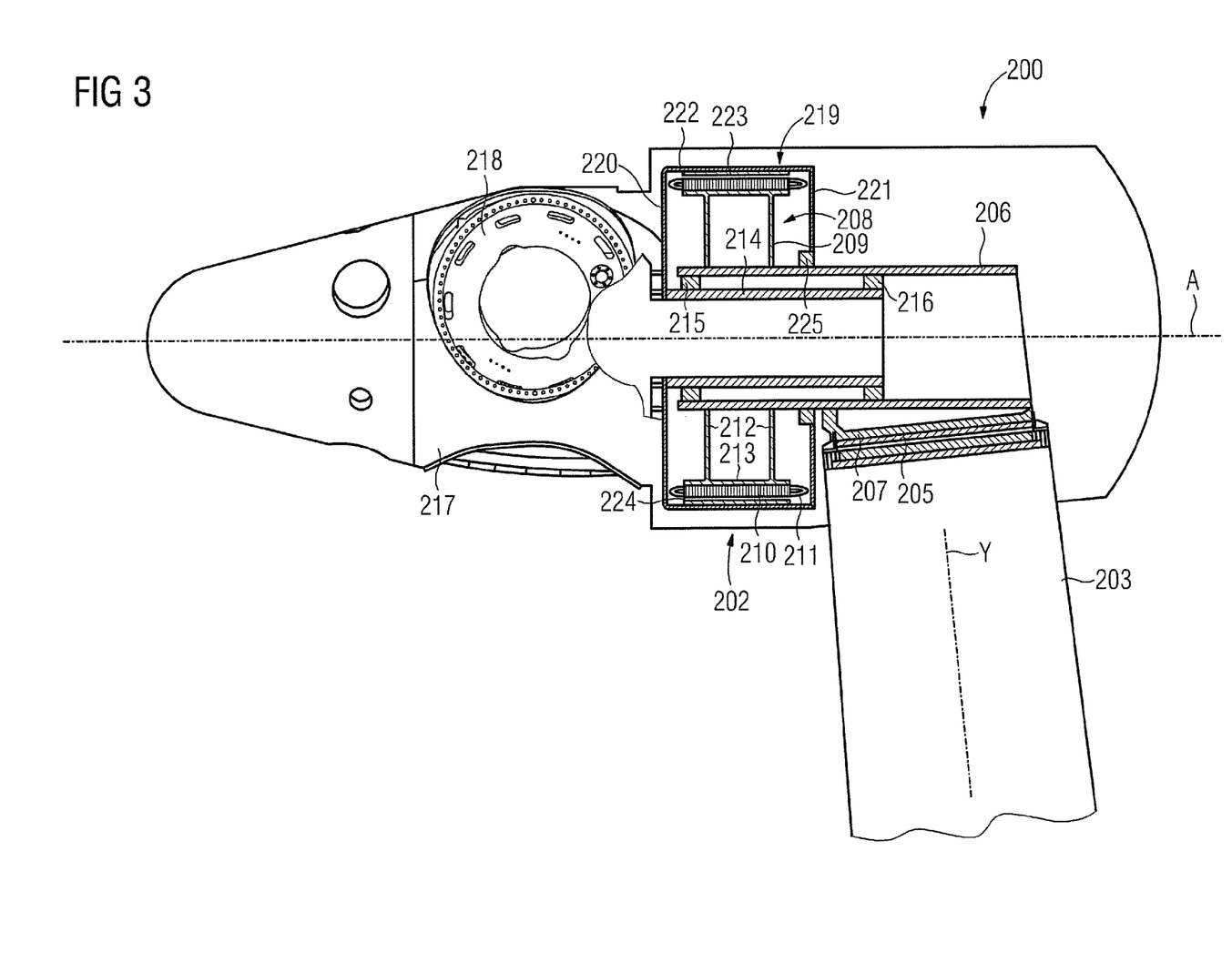
FIG. 3 shows a third type of a wind turbine comprising a direct drive generator having a flexible endplate and FIG. 4 shows a fourth type of a wind turbine comprising a direct drive generator having a flexible endplate.

FIG. 3 shows schematically a third embodiment of a wind turbine 200 comprising a direct drive generator 202 having a centre axis A which is arranged on the upwind side of a tower 203 of the wind turbine 200.

The wind turbine 200 comprises a stationary outer shaft 206. The rear side of the stationary outer shaft 206 is attached to a retaining arrangement 207 which is attached to a bedplate 205. On the front side of the stationary outer shaft 206 a stator arrangement 208 of the direct drive generator 202 is arranged. The stator arrangement 208 comprises a stator support structure 209 and a lamination stack 210 with windings 211. The stator support structure 209 comprises two support elements 212 for a two side support of the lamination stack 210. In case of the present embodiment of the invention the support elements 212 are ring-shaped support elements 212 attached, e.g. bolted, to the outside of the stationary outer shaft 206. The ring-shaped support elements 212 are able to be compact or are able to comprise spokes or a spoke structure. A kind of hollow cylindrical support element 213 is attached to the outer ends of the ring-shaped support elements 212. The hollow cylindrical support element 213 carries the ring-shaped lamination stack 210 with windings 211. The lamination stack 210 is able to comprise ring segment shaped lamination stack segments each having at least one winding 211 which segments build in their entirety the lamination stack 210.

A rotatable inner shaft 214 is arranged inside the stationary outer shaft 206 and rotatably supported by two main bearings 215, 216 against the stationary outer shaft 206. In case of the present embodiment of the invention the centre axis A is a joint centre axis A of the direct drive generator 202, the rotatable inner shaft 206 and the stationary outer shaft 214. A hub 217 is connected to the front end of the rotatable inner shaft 214 e.g. by means of bolts. The hub 217 comprises three mounting devices 218 for three not shown, but well known wind turbine rotor blades. Thus the rotatable inner shaft 214 can turn together with the hub 217.

A rotor arrangement 219 is substantially arranged around the stator arrangement 208. In case of the present embodiment of the invention the rotor arrangement 219 comprises a front ring-shaped endplate 220, a rear ring-shaped endplate 221 and a hollow cylindrical rotor element 222 connecting the front ring-shaped endplate 220 and the rear ring-shaped endplate 221 to each other. On the inside the hollow cylindrical rotor element 222 comprises a plurality of permanent magnets 223 substantially arranged oppositely to the lamination stack 210. An air gap 224 having a width of approximately 5 mm is located between the permanent magnets 223 and the lamination stack 210.

In case of the present embodiment of the invention the front ring-shaped endplate 220 is connected e.g. bolted to the hub 217 and the rotatable inner shaft 214. The rear ring-shaped endplate 221 is connected to the stationary outer shaft 206 by means of a third bearing, a so called support bearing 225. Thus also the rotor arrangement 219 has a two side support. Moreover the rotor arrangement 219 can turn together with the hub 217 and the rotatable inner shaft 214, wherein in particular the permanent magnets 223 turn relatively to the lamination stack 210 for power generation.

For avoiding situations in which the three-bearing arrangement comprising the two main bearings 215, 216 and the support bearing 225 is statically undetermined the front endplate 220 of the rotor arrangement 219 comprises an adequate flexibility in the directions of the centre axis A. Thereby the front endplate 220 acts like a membrane supporting the rotor arrangement 219 substantially firmly in the radial direction so as to maintain the width of the air gap 224, but flexing readily so as to allow e.g. a bending of the rotatable inner shaft 214 and the stationary outer shaft 206 with no major resistance. The front endplate 220 has such dimensions that it has a comparatively little bending stiffness. It simply flexes passively when e.g. the rotatable inner shaft 214 is shifted a bit by deflection. Thus when a bending of the rotatable inner shaft 214 and the stationary outer shaft 206 which are connected to each other by means of the main bearings 215, 216 occurs the front endplate 220 bends in the directions of the centre axis A wherein the width of the air gap 224 is maintained substantially constant or within required tolerances. Again an uneven load distribution between the three bearings is avoided.

The front endplate 220 is made of fibreglass and has a thickness of approximately 15-55 mm, preferably of 20-30 mm. The rear endplate 221 of the rotor arrangement 219 is also able to be made of fibreglass or steel. Normally the rear endplate 221 has a higher thickness as the front endplate 220.

In an embodiment of the invention the support bearing is a four-point bearing capable of transmitting high axial loads in both directions of the centre axis A.

Figure 4:
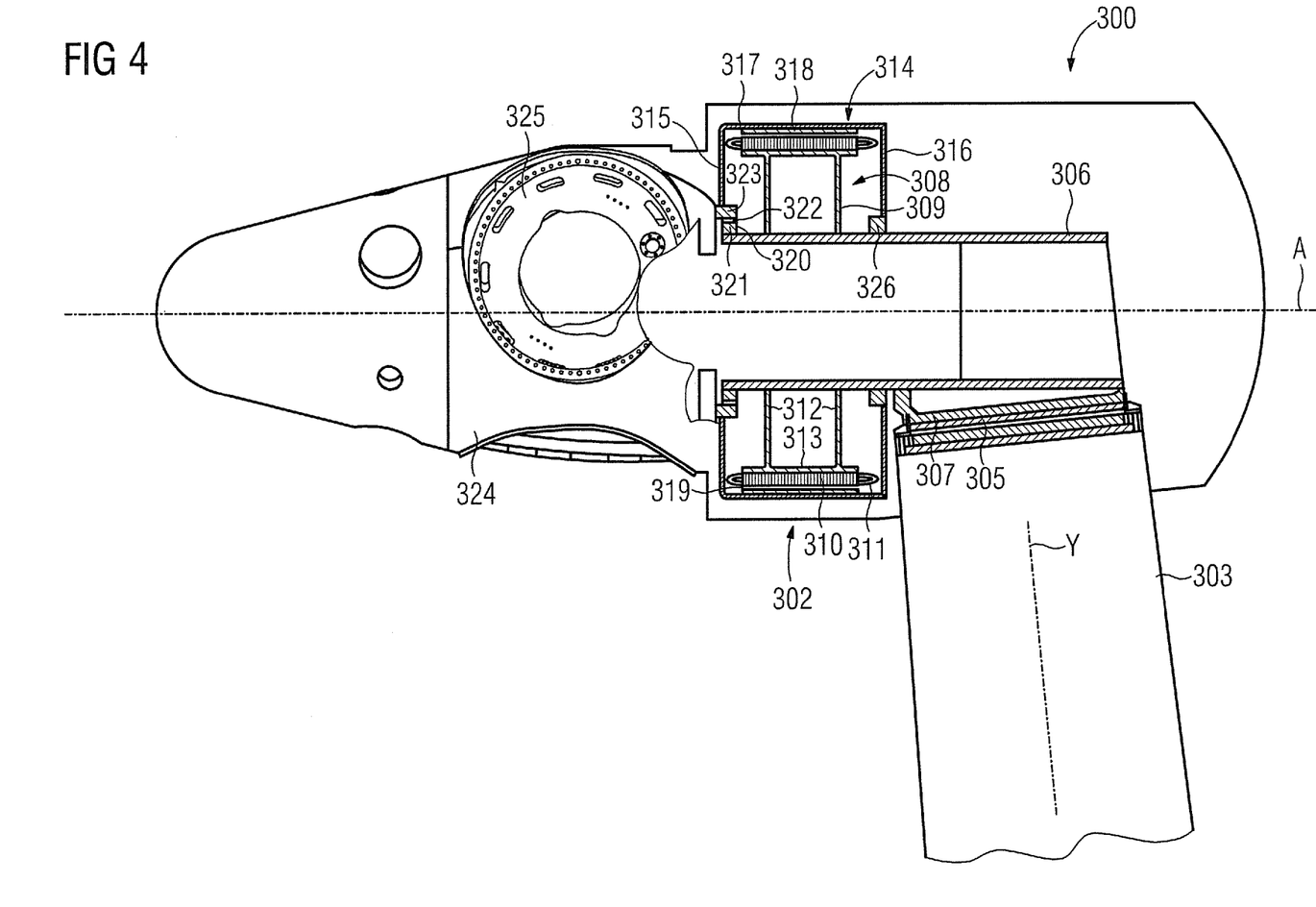

FIG. 4 shows schematically a fourth embodiment of a wind turbine 300 comprising a direct drive generator 302 having a centre axis A which is arranged on the upwind side of a tower 303 of the wind turbine 300.

The wind turbine 300 comprises a stationary shaft 306. The rear side of the stationary shaft 306 is attached to a retaining arrangement 307 which is attached to a bedplate 305. On the front side of the stationary shaft 306 a stator arrangement 308 of the direct drive generator 302 is arranged. The stator arrangement 308 comprises a stator support structure 309 and a lamination stack 310 with windings 311. The stator support structure 309 comprises two support elements 312 for a two side support of the lamination stack 310. The support elements 312 are ring-shaped support elements 312 attached, e.g. bolted, to the outside of the stationary shaft 306. The ring-shaped support elements 312 are able to be compact or are able to comprise spokes or a spoke structure. A kind of hollow cylindrical support element 313 is attached to the outer ends of the ring-shaped support elements 312. The hollow cylindrical support element 313 carries the ring-shaped lamination stack 310 with windings 311. The lamination stack 310 is able to comprise ring segment shaped lamination stack segments each having at least one winding 311 which segments build in their entirety the lamination stack 310.

A rotor arrangement 314 is substantially arranged around the stator arrangement 308. In case of the present embodiment of the invention the rotor arrangement 314 comprises a front ring-shaped endplate 315, a rear ring-shaped endplate 316 and a hollow cylindrical rotor element 317 connecting the front ring-shaped endplate 315 and the rear ring-shaped endplate 316 to each other. On the inside the hollow cylindrical rotor element 317 comprises a plurality of permanent magnets 318 substantially arranged oppositely to the lamination stack 310. An air gap 319 having a width of approximately 5 mm is located between the permanent magnets 318 and the lamination stack 310.

In case of the present embodiment of the invention the front ring-shaped endplate 315 is indirectly arranged on the stationary shaft 306 by a four-point bearing 320 capable of transmitting high axial loads in both directions of the centre axis A. An appropriate four-point bearing is e.g. disclosed in DE 201 16 649 U1. The stationary part 321 of the four-point bearing 320 is attached to the stationary shaft 306. The rotating part 322 of the four-point bearing 320 is in case of the present embodiment of the invention connected to a mounting ring 323. The front endplate 315 as well as the hub 324 of the wind turbine 300 are attached e.g. bolted to the mounting ring 323. By the way the hub 324 comprises three mounting devices 325 for three not shown, but well known wind turbine rotor blades.

The rear ring-shaped endplate 316 is connected to the stationary shaft 306 by means of another four-point bearing 326, a so called support bearing 326. Thus also the rotor arrangement 314 has a two side support. Moreover the rotor arrangement 314 can turn together with the hub 324 relatively to the stator arrangement 308, wherein in particular the permanent magnets 318 turn relatively to the lamination stack 310 for power generation.

For avoiding situations in which the bearing arrangement comprising the two four-point bearings 320 and 326 is statically undetermined the front endplate 315 of the rotor arrangement 314 comprises and adequate flexibility in the directions of the centre axis A. Thereby the front endplate 315 acts like a membrane supporting the rotor arrangement 314 substantially firmly in the radial direction so as to maintain the width of the air gap 319, but flexing readily so as to allow e.g. a bending of the stationary shaft 306 with no major resistance. The front endplate 315 has such dimensions that it has a comparatively little bending stiffness. It simply flexes passively when e.g. the stationary shaft 306 is shifted a bit by deflection. Thus when a bending of the stationary shaft 306 occurs the front endplate 315 bends in the directions of the centre axis A wherein the width of the air gap 319 is maintained substantially constant or within required tolerances. As previously mentioned an uneven load distribution between the bearings is avoided.

The front endplate 315 is made of fibreglass and has a thickness of approximately 15-55 mm, preferably of 20-30 mm. The rear endplate 316 of the rotor arrangement 314 is also able to be made of fibreglass or steel. Normally the rear endplate 316 has a higher thickness as the front endplate 315.

Moreover it is not necessary that both bearings, the main bearing 320 and the support bearing 326 are four-point bearings. It is also possible that only the main bearing 320 or only the support bearing 326 is a four-point bearing.

A ring-shaped endplate having a certain flexibility need not to have this flexibility in the whole endplate. Thus the ring-shaped endplate is able to have different areas. The ring-shaped endplate may have e.g. a comparatively rigid area e.g. for the attachment to a component of the wind turbine and an area having the mentioned flexibility in the directions of the centre axis A.

Furthermore the respective endplate need not to be completely made of fibreglass. Thus the endplate may have an area made of fibreglass and comprising the required flexibility and an area made of another material e.g. steel for mounting reasons.

The invention claimed is:

1. Direct drive generator for a wind turbine, comprising a stator arrangement; and
   a rotor arrangement,
   wherein the stator arrangement and/or the rotor arrangement comprises an at least partly flexible front and/or rear endplate, and
   wherein the endplate is at least partly made of fiberglass.

2. The direct drive generator according to claim 1, further comprising:
   a centre axis, wherein the endplate is at least partially in a certain extent flexible in the directions of the centre axis.

3. The direct drive generator according to claim 2, wherein the endplate is a ring-shaped endplate.

4. The direct drive generator according to claim 1, wherein the endplate is a ring-shaped endplate.

5. The direct drive generator according to claim 1, wherein the endplate has a thickness of approximately 15-50 mm.

6. The direct drive generator according to claim 1,
   wherein the stator arrangement is substantially arranged around the rotor arrangement,
   wherein the stator arrangement comprises a front endplate, a rear endplate and a hollow cylindrical stator element which connects the front endplate and the rear endplate with each other.

7. The direct drive generator according to claim 6, wherein the hollow cylindrical stator element comprises at least one lamination stack with at least one winding.

8. The direct drive generator according to claim 6, wherein the rotor arrangement is substantially arranged inside the stator arrangement.

9. The direct drive generator according to claim 8, wherein the rotor arrangement comprises a front endplate, a rear endplate and a hollow cylindrical rotor element which connects the front endplate and the rear endplate with each other.

10. The direct drive generator according to claim 9, wherein the hollow cylindrical rotor element comprises at least one permanent magnet.

11. The direct drive generator according to claim 1,
    wherein the rotor arrangement is substantially arranged around the stator arrangement,
    wherein the rotor arrangement comprises a front endplate, a rear endplate and a hollow cylindrical rotor element which connects the front endplate and the rear endplate with each other.

12. The direct drive generator according to claim 11, wherein the hollow cylindrical rotor element comprises at least one permanent magnet.

13. The direct drive generator according to claim 12, wherein the stator arrangement is substantially arranged inside the rotor arrangement and comprises a stator support structure.

14. The direct drive generator according to claim 13, wherein the stator support structure comprises a lamination stack with at least one winding.

15. The direct drive generator according to claim 11, wherein the stator arrangement is substantially arranged inside the rotor arrangement and comprises a stator support structure.

16. A wind turbine, comprising:
    a direct drive generator according to claim 1; and
    a drive configuration for turning the rotor arrangement relatively to the stator arrangement,
    wherein the drive configuration comprises at least three bearings.

17. A wind turbine, comprising:

a direct drive generator according to claim 1; and a drive configuration for turning the rotor arrangement relatively to the stator arrangement, wherein the drive configuration comprises two bearings, wherein at least one of the two bearings is a four-point bearing.

* * * * *